Jan. 1, 1963 J. H. WALKER Re. 25,313

MEANS AND METHOD FOR MAKING TUBES
FROM A THERMOPLASTIC MATERIAL
Original Filed Oct. 14, 1957

JAMES H. WALKER,
INVENTOR.
HERZIG & JESSUP,
ATTORNEYS.

BY

Albert M. Herzig

United States Patent Office

Re. 25,313
Reissued Jan. 1, 1963

25,313

MEANS AND METHOD FOR MAKING TUBES FROM A THERMOPLASTIC MATERIAL

James H. Walker, Los Angeles, Calif., assignor to J. H. Walker, Inc.

Original No. 2,900,665, dated Aug. 25, 1959, Ser. No. 689,836, Oct. 14, 1957. Application for reissue Jan. 9, 1961, Ser. No. 81,659
7 Claims. (Cl. 18—19)

Matter enclosed in heavy brackets [ ] appears in the original patent but forms no part of this reissue specification; matter printed in italics indicates the additions made by reissue.

This invention relates to a means and method for making tubes from a thermoplastic material and more particularly to a means and method for making a tube closed at one end thereof and open at the other end, ready for filling through the open end with petroleum jelly, toothpaste, shaving cream, cosmetics, detergents, or the like, and further relates to a means and method for forming a closure on an end of an extruded tube of thermoplastic material for the same purpose and to incorporation of impervious layers of suitable materials for the proposed contents of the tube. The closures optionally include blank reduced ends as for a one-shot tube, or external threads for removably mounting a cap thereon.

Thin-wall tubes have heretofore required very close control of the plastic and mold temperatures, high pressure and high injection speed to obtain proper dispersion of material in the mold to prevent cooling and setting of the plastic before the mold is filled. Injection molding of polyvnyl chloride in particular, and other similar materials, requires a very critical temperature control as such temperatures must be maintained close to or beyond the decomposition point of the plastic. The difficulty of handling such material is increased by the nature of the injection process with the inherent necessity of intermittently stopping the flow of the plastic, thereby increasing the danger of heat damage thereof. Because of the critical temperatures involved in the molding of material such as polyvinyl chloride, it is difficult to find operators who are sufficiently qualified and often even the more difficult to find operators who are willing to undertake such a molding procedure.

It is therefore an object of this invention to provide a new and improved means and method for forming tubes from selected thermoplastic material, which provides an improved means for heating the material to the temperatures desired without causing damage to the material from overheating, or underheating.

It is another object of this invention to provide a means and method for molding a tube of thermoplastic material in which the amount of material heated to the desired molding temperature will not be appreciably greater than that required for the precise amount needed to fill the mold, whereby the area of the material which is unused will not deteriorate from extreme temperature and can therefore be reused.

Another object of this invention is to provide a means and method for forming tubes in which the material is brought more quickly to a molding temperature, whereby damage to the material from prolonged periods of heating is eliminated, and in which the heat is uniformly imparted throughout the plastic. By the instant unique mode of use of radio-frequency waves to heat the material, there is no overheating of the surface of the material while waiting for the interior thereof to heat by conduction. Also, thick sections can be more effectively heated, thereby eliminating limitations on the thicknesses of the materials to be used as presented by other means and methods in the prior art of heating such as by infra-red radiation, or by conduction.

It is a further object of this invention to provide a means and method of the character described in which the transport, preheating, delivery and orientation stresses in the material are eliminated and die pressure and die wear is greatly reduced, whether due to under-heating or arcing or other limitations of equipment and power requirements.

Yet another object of this invention is to provide such means and method for molding tubes from thermoplastic material in which various cross-section of parts may be molded, such as a thick-walled, threaded or variable cross-sections, wherein the plastic material can be safely brought to decomposition temperatures to insure the complete filling of the mold and accurate reproduction of fine threads and/or other details.

An additional object of this invention is to provide a new and improved means and method for preheating and molding a tube from a thermoplastic material which is capable of quickly and accurately forming such tubes without requiring highly skilled operators, thereby being more adaptable to mass production of the tubes.

A still further object of this invention is to provide a new and improved means and method for molding tubes from a continuous ribbon of material and which provides a practical variance in the composition of material to be used, in the thicknesses of the material and in the temperatures during molding, while still retaining the desired qualities and properties of the material.

It is a general object of this invention to provide a new and improved means and method for molding tubes from thermoplastic material which overcomes disadvantages of prior means and methods heretofore intended to accomplish generally similar purposes.

These and other objects of this invention will be more apparent to one skilled in the art from the following detailed discription of the drawing and appended claims.

Figure 1:
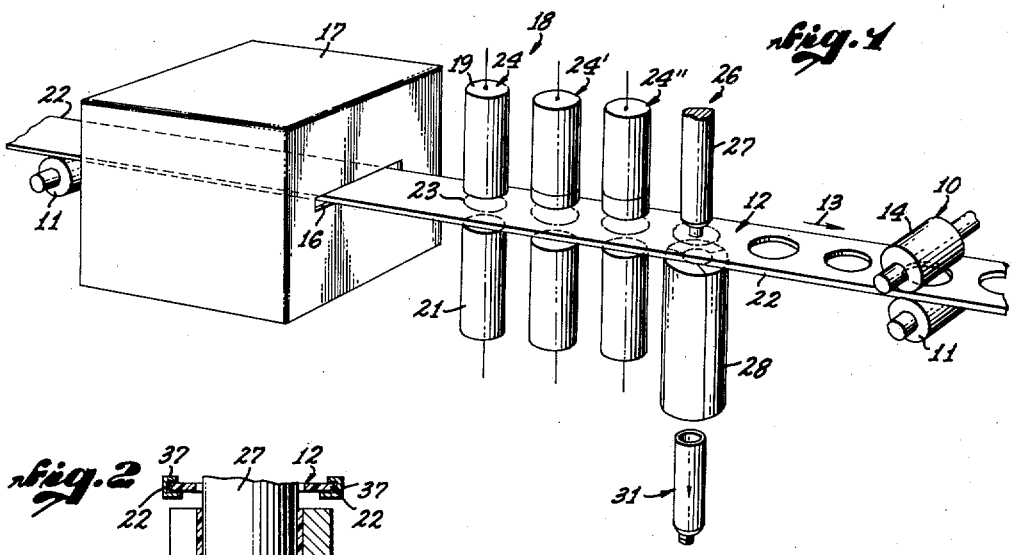
FIG. 1 is a schematic view, in perspective, of an apparatus and method illustrative of a preferred embodiment of this invention.
Figure 2:
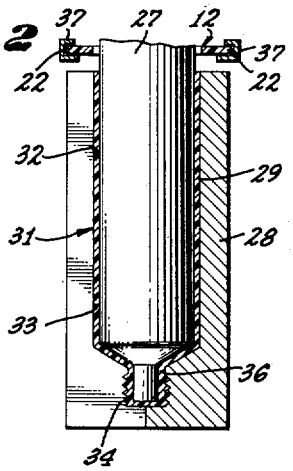
FIG. 2 is an enlarged vertical sectional view as seen in the forming stage of the molding dies.

Referring to the drawings, and more particularly to FIGS. 1 and 2, there is shown by way of illustration but not of limitation, a conveyor apparatus generally referred to by the numeral 10 which includes support rollers 11, two of which are illustrated in FIG. 1. The rollers 11 are not necessarily limited to such number, two rollers being shown for illustrative purposes only. Other support and conveying means such as the rollers 11 may be provided where desirable and practical.

A strip 12, of thermoplastic material preferably polyvinyl chloride or the like, is supported upon the rollers like 11, and driven in a direction indicated by the arrow 13 as by a drive roller indicated at 14. The strip 12 may as herein stated be driven by any such suitable means located along or at convenient points in the conveyor apparatus 10, to convey the strip 12 as in a substantially horizontal plane from a source of supply (not shown) through openings 16 of a preheat oven 17.

The strip 12 is preheated while passing through the oven 17 to a temperature at which the material is softened but at which sufficient tensile strength is retained to permit further conveyance without distortion through subsequent stations.

A heating station 18 is located adjacent the oven 17, and preferably comprises a plurality of upper and lower electrodes 19 and 21, respectively. The electrodes are connected to a suitable circuit to receive thereacross a radio-frequency voltage, causing a radio-frequency field to be established in and superheat the strip 12 being conveyed therebetween. Said electrodes 19 and 21 may be of any desired shape and configuration, and are illustrated as being advantageously cylindrical, to effect circular patterns of superheated areas in the strip 12. The electrodes 19 and 21 are aligned with the central portion of the strip 12, leaving the side edges 22 of the strip at the relatively lower temperature subjected by the oven 17. Therefore, only the central circular areas are heated by the high frequency voltage of the electrodes and the edges 22 remain in a conveyable state. The strip 12 is preferably moved intermittently by suitable apparatus within the skill of the prior art (not shown) in order to bring the central areas progressively between succeding electrodes 19 and 21, whereby the first set of electrodes or heater indicated generally by the numeral 24 can be supplied with a high voltage substantially lower than the ultimate voltage desired to impart the temperature required to bring the strip to a plastic state. As the strip 12 passes between the electrodes 19 and 21 of the heater 24, the temperature of the central area 23 is quickly increased above the temperature of the material as it comes out of the oven 17. An intermittent motion of the strip 12 places the circular central area 23 between the electrodes 19 and 21 of the next heater 24', at which point the temperature is further increased. The strip 12 is again moved until the area 23 is placed between the electrodes 19 and 21 of a third heater 24'' at which point the temperature is increased until the material has reached a plastic state, ready to be formed. Meanwhile, two additional areas like 23 have been progressively raised in temperature by the heaters 24 and 24', as the strip 12 is progressively conveyed.

An additional movement of the strip 12 positions the area 23 in alignment with a forming or molding station 26, which comprises a plunger or male die 27 and a female die 28. The male die 27 is preferably positioned above the strip 12 and the female die 28 beneath the strip 12, the dies 27, 28 being in alignment with an area 23 which has been superheated as heretofore described. The male die is then caused to descend rapidly into the area 23 of near-fluid material to draw the material downwardly out of the plane of the strip 12 and into the interior of the die 28. It is preferable that the plunger 27 descend at a very high speed to cause dispersion of the plastic material into thin sections before it has time to cool. In addition, the energy of the rapidly moving plunger is converted into heat energy in the plastic which aids the molding process.

Optionally the plastic strip 12 is moved along at a steady rate and the electrodes, e.g., 24, 24', 24'' are intermittently and synchronously energized to achieve the desired progressively increasing temperature of the moldable areas 23, all by suitable means (not shown).

As best seen in FIG. 2, wherein the plunger 27 is illustrated as being at the end of a downward stroke within the female die 28, the wall 29 of the tube 31 thus formed is predicated upon the annular space 32 formed between the plunger 29 and the cavity 33 of the female member 28. If desired, external threads 34 may be formed on the neck 36 of the container 31, in which event the female die 28 is preferably of a split-die type, whereby the sections of the die may be separated to release the formed container 31 after cooling. If desired, however, the container may be screwed out of a one-piece die 28 which is less desirable because of the time consumed by the necesssity to unscrew the part from the mold. The same may also, by virtue of the flexibility of the materials, be stripped from the mold.

A pair of longitudinal guide members 37 are preferably provided to support the edges 22 of the strip 12 as it passes through the heating and molding stations 18 and 26, respectively, to support the strip 12, and are preferably spaced sufficiently to permit movement of the plunger 27 therebetween.

The strip 12, as it is conveyed from the oven 17, tends to become quite tacky. It is therefore preferable to coat the interior of the guide members 37, the exterior of the rollers 14 and 11, and the inner ends of electrodes 19 and 21, which come into contact with the strip 12, with a coating as of Teflon, or the like, to prevent adhesion of these parts to the plastic.

EXAMPLE

As an example of the foregoing means and methods, a strip of polyvinyl chloride consisting of 100 parts of resin, about 55 to 73 parts of plasticizer, and approximately 3 parts of stabilizer, which was held with a thickness tolerance of + or −2%, was used for a molding material, said thickness tolerance being readily obtainable in commercial practice. Although the foregoing composition has been specified as an example, it has been found that the percentage of plasticizer may vary as indicated, increased plasticizer resulting in a less rigid strip proportionally as the percentage of the plasticizer is increased. The stabilizer may be omitted if desired, or if used may be varied from one to six parts relative to the other ingredients. Oxidation, decomposition and discoloration is of course retarded in proportion to the amount of stabilizer added. The thickness of the strip is preferably measured by the volumetric requirements of the mold, so that the amount of material in the superheated zone 23 will preferably exactly fill the mold. In the instant example, such a plastic strip ⅛ of an inch thick was preheated in an oven similar to 17 to a temperature of approximately 119° C. At this point the material was softened but still retained enough tensile strength to permit being mechanically conveyed on rollers without distortion through the heating and molding stations. The range of oven temperature may be varied to approximately 10% lower, and is preferably lower yet for thinner sheets. The oven may be controllably heated in any desired economical manner, as by burners or coils for raising the plastic strip to its optimum initial temperature.

An area of the strip, slightly larger than that of the plunger of the mold, was then heated by radio-frequency energy, in this instance 1 kilowatt of power at a frequency of 40 megacycles per second. The impressed voltage was adjusted to an amount just under that which would cause dielectric breakdown of the plastic. The frequency may vary from approximately 27 megacycles to as high as can be practically applied.

The radio-frequency power was, in the present example, maintained until the plastic reached a temperature range of 200° C. to 233° C. At the latter temperature, the heated zone was quite fluid and flowed easily into the mold. This temperature is beyond the decomposition point of the plastic, so that immediate rapid actuation of the plunger was accomplished to preclude damage from overheating.

Because of undesired arcing which would occur between the electrodes 19 and 21 with the use of the greater radio-frequency voltage required to superheat an area 23 in a single stage, progressively increased temperature of the areas with a constant voltage is preferred. As the material is progressively heated, the power factor increases, and the heat generated in the material increases, but the dielectric breakdown strength decreases. Therefore, the voltage at each progressive stage as 24, 24' 24'' is preferably low enough to prevent arcing as the power absorption increases. A single or constant radio-frequency source may be supplied to all of the stages, by providing an adjustment for proper energy distribution. For this purpose, a low loss insulating material [indicated in broken lines 55] may be interposed between the electrodes 19 and the plastic sheet 12, and the thickness of the insulating material increased in each successive stage so that the net electrical characteristics of each stage 24, 24' 24'' remains substantially uniform and the area 23 receives the desired amount of heat at each stage, becoming more plastic at each stage.

The electrodes 19 may optionally be progressively vertically spaced from the strip 12, thereby providing increasing air gaps between the electrodes and the strip to compensate for the increase in power absorption as the strip becomes heated. Alternatively, a progressively decreasing radio-frequency voltage may be supplied to the electrodes 24, 24', 24'', respectively.

As previously modified, the plunger 27 of the molding station 26 is rapidly descended to cause dispersion of the plastic into thin sections before it has time to cool. For this purpose, a punch press operating at approximately 300 strokes per minute, provides a revolution of approximately ⅕ of a second, i.e., 1/10 of a second for the down stroke which is satisfactory.

Figure 3:
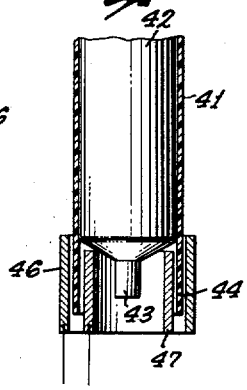
FIGS. 3, 4 and 5 are vertical sectional views of another embodiment of this invention, illustrating the superheating and molding stages thereof.
Figure 4:
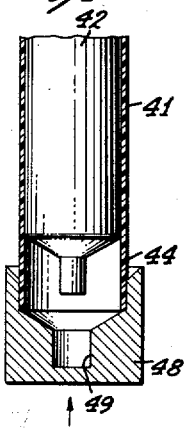
Figure 5:
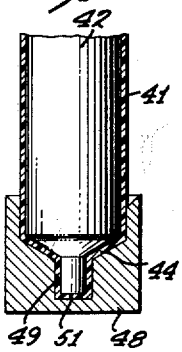

Referring to FIGS. 3, 4 and 5, another embodiment of the invention is illustrated, wherein an extruded tube 41 is telescoped over a mandrel 42 of cylindrical or other desired configuration. Said mandrel may be provided with a reduced portion 43 of appropriate desired configuration to form the inner surface of the neck and/or closure for the container. The lower annular end 44 of the tube 41 is intercalated between a pair of annular electrodes 46 and 47 either separate as shown or incorporated in the die, but in any event connected as to a high radio-frequency circuit, to superheat the end 44 to a temperature at which said end is rendered relatively fluid in similar manner and condition to that heretofore noted. The mandrel 42 and tube 41 are then transferred to a molding stage where the lower end 44 of the tube is inserted into a female die member 48 which includes a cavity 49 complementary to the configuration of the lower end 43 of the mandrel 42. The die 48 is rapidly converged upon the mandrel 42 and tube 41, before the end 44 cools, to fill the annular space between the cavity 49 and the lower end 43 of the mandrel with the heated and fluid plastic material. The end of the tube may be closed as by a web 51 or in any other manner, if desired. In this instance, the mandrel 42 and die member 48 are forced axially together by mechanical means (not shown) to form the neck and closure as illustrated in FIG. 5.

Figure 6:
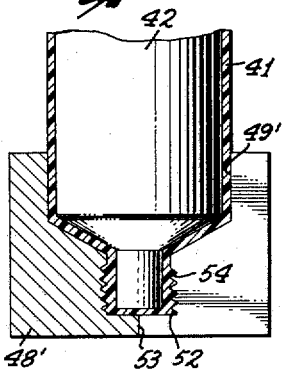
FIG. 6 is a vertical sectional view illustrating a modification of the die of the embodiments of FIGS. 3–5 wherein threads are formed on the closure end of the tube.

Referring to FIG. 6, another embodiment similar to that disclosed in FIGS. 3 through 5, is illustrated wherein like parts are referred to by like numbers.

The mandrel 42 and tube 41, in this instance, are brought into operating association with a female die member 48' which includes interior threads 52 in the cavity 49'. To facilitate separation of the finished tube 41 from the die member 48', the die is preferably split as along an axis 53 to enable the die sections to be radially separated from the tube 41 without disturbing or marring the threads 54 formed thereon, or the same can be otherwise stripped from the die.

While I have herein shown and described what I conceived to be the most desired embodiment of my invention, it is to be understood that alterations and modifications thereof may be made in a manner to satisfy the spirit of my invention which is intended to comprehend any and all equivalent devices as comprehended in the following claims.

What I claim as new and desired to secure by Letters Patent is:

1. An apparatus for forming containers or other molded articles which comprises: means for intermittently conveying a strip of thermoplastic material along a predetermined path to sequentially position spaced areas thereof at successive spaced stations; means for preheating said strip to a temperature at which said strip is in a softened yet conveyable state; means for progressively superheating predetermined spaced central areas of said strip to a relatively high temperature at said successive spaced stations wherein said central areas are rendered plastic; mold means adjacent said path having male and female portions for forming containers from said central areas, and means for moving said male portion through said central areas whereby to displace the material thereof into said female portion.

2. An apparatus for forming containers or other molded articles which comprises: conveyer means for intermittently conveying a strip of thermoplastic material along a predetermined path to sequentially position spaced areas thereof at successive spaced stations; oven means surrounding a portion of said conveyer for preheating said strip to a temperature at which said strip is in a softened but conveyable state; a plurality of spaced pairs of electrodes adapted to be connected to a high voltage, high frequency circuit juxtaposed to said strip at said stations for progressively superheating predetermined spaced central portions of said strip to a relatively high temperature wherein said central portions are rendered plastic; plunger means juxtaposed to said strip and adapted for reciprocal movement transversely thereof for sequentially displacing the material in said central portions out of the plane of said strip; and mold means adjacent said strip and in alignment with said plunger means for forming said material around said plunger means.

3. An apparatus for forming containers or other molded articles which comprises: conveyer means for intermittently conveying a strip of thermoplastic material along a predetermined path to sequentially position spaced areas thereof at successive spaced stations; oven means surrounding a portion of said conveyer for preheating said strip to a temperature at which said strip is in a softened but conveyable state; guide means for supporting longitudinal edges of said strip; a plurality of opposing high voltage high frequency electrodes juxtaposed to said strip at said spaced stations for progressively superheating predetermined central areas of said strip to a relatively high temperature wherein said central areas are rendered plastic; male die means juxtaposed to said strip and spaced from said electrodes and reciprocably mounted for transverse movement relative to said strip for sequentially displacing the material in said central areas out of the plane of said strip; and female die means operatively associated with said male die means for forming said displaced material around said male die means and thereby form a container.

4. A method for forming containers or other molded articles from a strip of thermoplastic material comprising the steps of: intermittently conveying the strip along a predetermined path to sequentially position spaced areas thereof at succesive spaced stations; preheating the strip to a temperature at which the strip is in a softened yet conveyable state; progressively superheating spaced central areas of the strip to a relatively high temperature at said successive spaced stations whereby said central areas are rendered plastic; displacing the plastic material of said central areas out of the plane of the strips; and molding the displaced material.

*5. A method of forming containers or other molded articles comprising positioning a quantity of plastic material to be molded adjacent the mouth of a mold, heating the material while exterior of the mold to a near fluid state but to a consistency in which it can be so positioned, and causing a male die in the form of a plunger to move rapidly into and through the material to separate a discrete quantity thereof and carry the same into the space between the mold and the plunger to form a relatively thin section completely filling said space before the plas-*

*tic material has time to cool sufficiently to prevent dispersion.*

*6. The method of claim 5 wherein the plunger is caused to make its stroke into the mold in a time in the order of one tenth of a second whereby the plastic material is suddenly dispersed into said space.*

*7. A method as in claim 6 wherein the material to be molded is polyvinyl chloride in the form of a strip having portions preheated exteriorally of the mold to a temperature in the range of about 200° C. to 233° C.*

References Cited in the file of this patent or the original patent

UNITED STATES PATENTS

| | | |
|---|---|---|
| 669,331 | Thurber | Mar. 5, 1901 |
| 2,229,613 | Strauch | Jan. 21, 1941 |
| 2,233,175 | Melton et al. | Feb. 25, 1941 |
| 2,309,561 | Westin et al. | Jan. 26, 1943 |

| | | |
|---|---|---|
| 2,429,960 | Piperoux et al. | Oct. 28, 1947 |
| 2,531,539 | Smith | Nov. 28, 1950 |
| 2,626,430 | Dawson | Jan. 27, 1953 |
| 2,660,761 | Peters | Dec. 1, 1953 |
| 2,695,423 | Pardee et al. | Nov. 30, 1954 |
| 2,911,681 | Distler | Nov. 19, 1959 |
| 2,953,816 | Kidder | Sept. 27, 1960 |

FOREIGN PATENTS

| | | |
|---|---|---|
| 138,518 | Australia | Aug. 28, 1948 |
| 160,858 | Australia | Feb. 1, 1955 |
| 722,620 | Great Britain | Jan. 26, 1955 |
| 752,221 | Great Britain | July 4, 1956 |
| 558,891 | Belgium | July 31, 1957 |

OTHER REFERENCES

Plastics Engineering Handbook (The Society of the Plastics Industry), published by Reinhold Publishing Corp., New York, 1954 (pp. 97, 99 relied on).